United States Patent [19]

Chi et al.

[11] 4,285,770
[45] Aug. 25, 1981

[54] JET PUMP WITH LABYRINTH SEAL

[75] Inventors: Lawrence L. Chi, Fremont; Alvydas A. Kudirka, La Crescenta, both of Calif.

[73] Assignee: General Electric Company, San Jose, Calif.

[21] Appl. No.: 56,813

[22] Filed: Jul. 12, 1979

[51] Int. Cl.³ .............................................. G21C 19/28
[52] U.S. Cl. .......................................... 176/65; 176/87
[58] Field of Search ...................................... 176/65, 87

[56] References Cited
U.S. PATENT DOCUMENTS 4,043,705 11/1975 Schlosser ........................... 176/65 X
4,092,214 5/1978 Schabert et al. .................. 176/65 X Primary Examiner—Peter A. Nelson
Attorney, Agent, or Firm—Ivor J. James, Jr.; Samuel E. Turner; Raymond G. Simkins

[57] ABSTRACT

In a jet pump for a nuclear reactor a slip joint is provided between the mixer and diffuser sections thereof to facilitate jet pump maintenance and to allow thermal expansion. To limit leakage flow through the slip joint to a rate below that which causes unacceptable flow induced vibration of the pump, there is provided a labyrinth seal for the slip joint in the form of a series of flow expansion chambers formed by a series of spaced grooves in the annulus of the slip joint.

3 Claims, 4 Drawing Figures

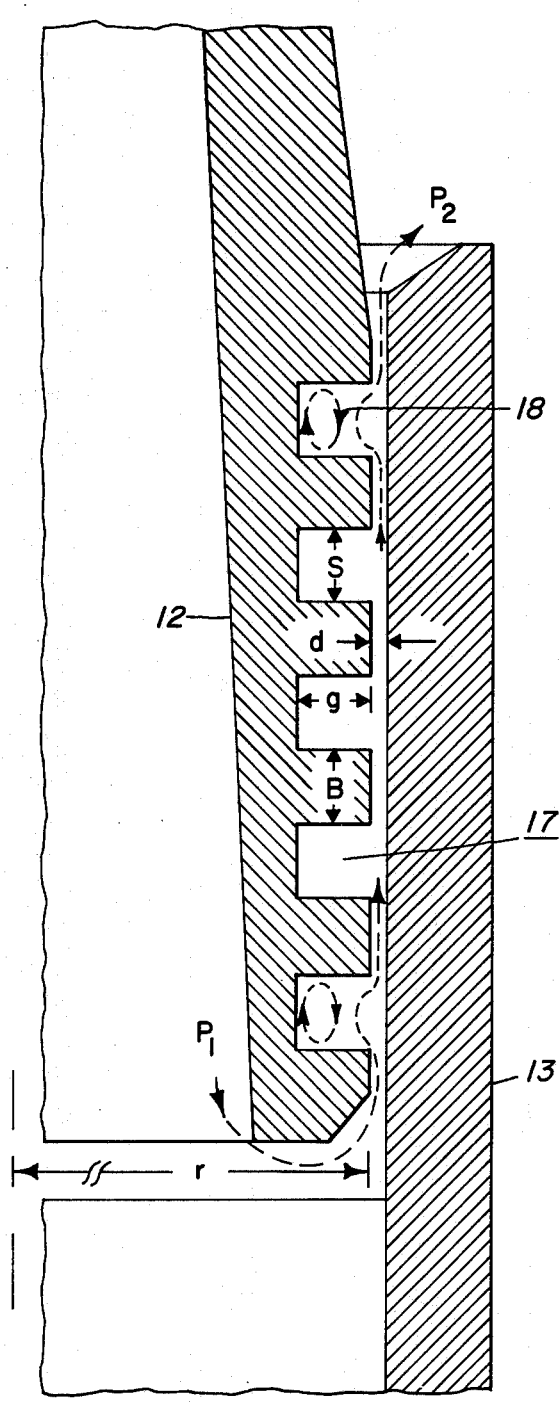
| EXAMPLE | | | | |
|---|---|---|---|---|
| g | d | S | B | r |
| 3.30 mm | 0.20 mm | 2.54 mm | 2.79 mm | 11.05 cm |
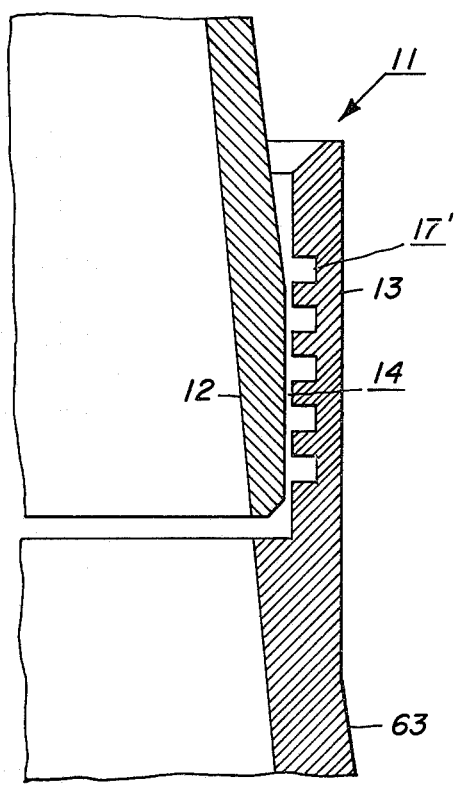
Fig. 4
Fig. 3

4,285,770

JET PUMP WITH LABYRINTH SEAL

BACKGROUND

The use of jet pumps for circulating a coolant fluid, such as water, through the fuel core of a nuclear reactor contained within a pressure vessel is well known as shown in U.S. Pat. Nos. 3,378,456; 3,389,055; 3,625,820 and 3,838,002 which are incorporated by reference herein.

A jet pump utilizes a stream of driving or motive fluid of high velocity to drive a stream of driven or suction fluid by momentum exchange between the two streams. In a known jet pump configuration a highly convergent suction inlet section is submerged in the driven fluid. A nozzle is positioned adjacent the suction inlet section, the nozzle receiving high-pressure driving fluid and directing a high-velocity stream of driving fluid into the suction inlet section by which driven fluid is entrained and driven into an elongated throat or mixer section where momentum is exchanged between the driving and driven fluids. The resulting flow exits the mixer section and enters a divergent diffuser section wherein flow velocity decreases and pressure increases.

In a typical nuclear reactor installation, as shown in FIG. 2B of U.S. Pat. No. 3,389,055, the jet pumps are vertically mounted and downwardly directed in a fluid downcomer annulus surrounding the nuclear reactor core whereby their operation pressurizes the coolant in a chamber beneath the core to thereby drive the coolant upward through the fuel assemblies of core.

As discussed in U.S. Pat. No. 3,389,055 and shown in FIG. 5 thereof, the mixer and diffuser sections are joined by a clearance fit slip joint. This facilitates the removal during reactor shutdown of the mixer section and other upper parts of the jet pump, which are subject to greatest wear, for inspection and repair or replacement as required. The slip joint also eliminates stress from thermal expansion differences between the carbon steel pressure vessel and the stainless steel jet pumps and core support structure.

Because there is a pressure differential across the slip joint, a leakage flow of fluid therethrough results. A limited amount of leakage flow through the slip joint is desirable to clean the joint and prevent crud and corrosion product buildup therein which might freeze the joint.

However, excessive leakage flow is found to cause undesirable jet pump vibration. Therefore, it is necessary to limit the leakage flow to a rate below that which induces damaging vibration.

A possible way to limit leakage flow is to reduce the annular clearance of the slip joint. However, this would require tighter manufacturing tolerances with attendant high cost and also increase the possibility of joint freezing. Another possibility is the use of some sort of sealing ring. This is undesirable because of the difficulty of remote handling of such parts and because of the possibility of breakage in use with the danger that broken parts might be carried into and become lodged in the reactor core. Furthermore it is desirable to provide leakage flow limiting without additional parts and without increase in the size of the parts.

Thus it is an object of the invention to limit leakage flow through the slip joint of a jet pump of a nuclear reactor without substantial additional cost or complication. Another object is to reduce leakage flow through the mixer-diffuser slip joint of a jet pump without additional parts or increase in size of the jet pump parts. A further object is reduction of leakage flow induced vibration of a jet pump to an acceptable level.

SUMMARY

These and other objects are achieved by providing in the annulus of the mixer-diffuser slip joint a labyrinth seal in the form of a series of flow expansion chambers which increase flow resistance and hence decrease leakage flow.

The expansion chambers may be provided by a series of spaced annular grooves formed in the mixer slip joint surface or in the diffuser slip joint surface. The number and dimensions of the grooves can be selected to provide the amount of leakage flow resistance desired. Thus no additional parts are required and, since the grooves may be relatively shallow the size of the slip joint parts normally need not be increased.

DRAWING

The invention is described in greater detail with reference to the accompanying drawing wherein:

FIG. 3 is an enlarged view of the jet pump slip joint showing a labyrinth seal formed by grooves in the slip joint portion of the diffuser section; and FIG. 4 is an enlarged view of the jet pump slip joint illustrating the leakage flow, the seal dimensions and dimensions of a specific example.

DESCRIPTION

Figure 1:
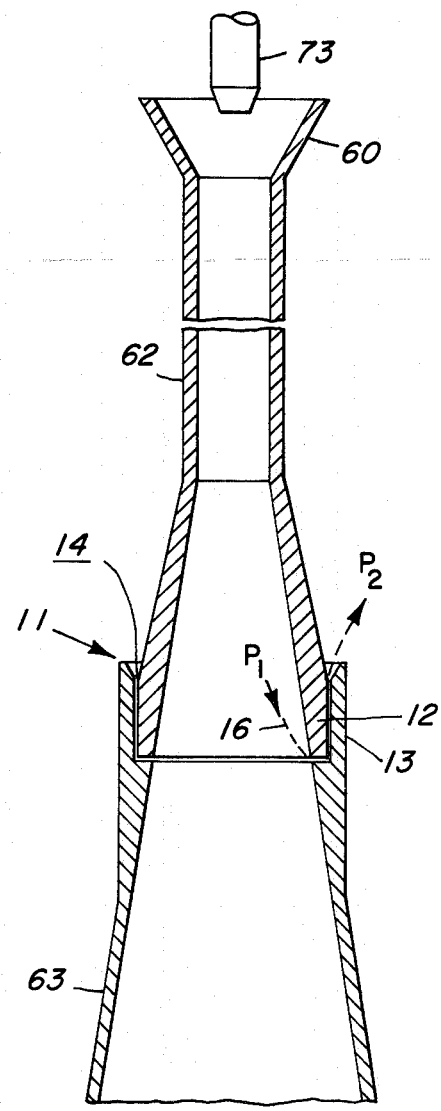
FIG. 1 is a simplified illustration, in longitudinal cross section view, of a jet pump.

A jet pump as illustrated in simplified form in FIG. 1 comprises a nozzle 73, an inlet section 60, a mixer section 62 and a diffuser section 63. Further details of the construction and operation of such a jet pump in a nuclear reactor are shown and described in the aforementioned U.S. Pat. No. 3,389,055.

For use in a nuclear reactor the mixer section 62 merges at its lower end into the divergent diffuser section 63 to which it is joined by a slip joint 11 to facilitate removal and maintenance of the mixer section and other upper portions of the jet pump and to permit differential thermal expansion.

The slip joint 11 is formed by a slip joint portion 12 at the lower end of the mixer section and by a slip joint portion 13 at the upper end of the diffuser section. These slip joint portions are formed to provide an annular clearance space 14 therebetween. Since there is a pressure differential ($P_1-P_2$) across the slip joint 11 when the pump is in operation there is a leakage flow of fluid through the clearance space 14 of the slip joint as illustrated by a dashed line 16.

With the minimum desired clearance space 14 it was found that under operating conditions the leakage flow was sufficient to cause undesirably severe leakage flow induced vibration of the jet pump.

In accordance with the invention, the leakage flow through the slip joint 11 is decreased to an amount below that which induces unacceptable vibration by forming a labyrinth seal in the slip joint which increases the flow resistance.

Figure 2:
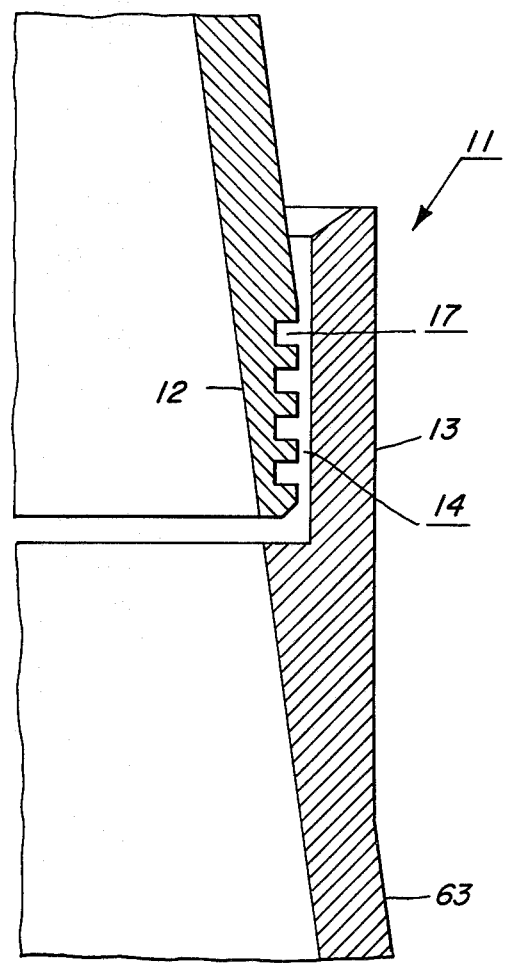
FIG. 2 is an enlarged view of the jet pump slip joint showing a labyrinth seal formed by grooves in the slip joint portion of the mixer section.

As shown in FIG. 2, such a seal is provided by a series of spaced grooves 17 formed in the outer surface of the mixer slip joint portion 12.

Alternatively, a similar series of grooves 17' can be formed in the inner surface of the diffuser slip joint portion as illustrated in FIG. 3.

Further discussion of the labyrinth seal of the invention is with reference to an example illustrated in FIG. 4.

The grooves 17 cause alternate large changes in flow velocity of the leakage flow as it passes at high velocity through the narrow gap portion and experiences sudden velocity decrease as it passes into the larger area of the groove portion. It is believed that the large increase in flow resistance provided by the spaced grooves results from flow separation and the formation of vortexes 18 in the grooves, these vortexes having a direction of motion (as indicated by the arrow heads) such as to oppose the leakage flow and thus increase the leakage flow resistance.

The effectiveness of the seal in increasing flow resistance is influenced by its dimensions as indicated in FIG. 4, namely, the width d of the annular gap 14 and the width S, the depth g and the spacing B of the grooves 17.

Flow resistance can be increased by increasing the number of grooves (i.e., a greater seal length), by decreasing the gap width d, by increasing the groove depth g, by decreasing the groove spacing B and by decreasing the groove width S.

In applications of the invention some of the dimensions of the seal are likely to be limited by practical considerations such as manufacturing tolerances, available space and maintenance of component strength. For example, the gap width d is limited by manufacturing tolerances (as discussed hereinbefore), groove depth g, width S and spacing B must be selected to avoid undue weakening of the component in which the grooves are formed and the number of grooves (i.e., the seal length) is limited to the length of the slip joint portion of the jet pump.

The dimensions of the specific example are set forth in FIG. 4 wherein r is the outer radius of the mixer section slip joint portion 12. Tests of the jet pump formed with such a seal indicated a reduction in leakage flow in the order of 40 percent and reduction of flow induced vibration to an acceptable level throughout the operating range of the jet pump.

For a particular application, the dimensions and arrangement of the grooves of the seal can best be determined by routine experiment to provide the degree of leakage flow reduction desired and the desired degree of freedom from flow induced vibration.

What is claimed is:

1. In a nuclear reactor having at least one jet pump for circulating coolant through the core of said reactor, said jet pump including a mixer section and a diffuser section joined by a slip joint having an annular clearance space, the improvement comprising a series of spaced cavities forming a labyrinth seal in said annular space to reduce leakage flow of coolant through said space whereby flow induced vibration of said jet pump is reduced to an acceptable level.

2. The jet pump of claim 1 wherein said series of cavities is provided by a series of grooves formed in the slip joint surface of said mixer section.

3. The jet pump of claim 1 wherein said series of cavities is provided by a series of grooves formed in the slip joint surface of said diffuser section.

* * * * *

UNITED STATES PATENT AND TRADEMARK OFFICE
Certificate

Patent No. 4,285,770          Patented August 25, 1981

Lawrence L. Chi and Alvydas A. Kudirka

Application having been made by Lawrence L. Chi and Alvydas A. Kudirka the inventors named in the patent above-identified, and General Electric Co., the assignee, for the issuance of a certificate under the provisions of Title 35, Section 256, of the United States Code, adding the name of Bettadapur Narayanarao Sridhar as a joint inventor, and a showing and proof of facts satisfying the requirements of the said section having been submitted, it is this 29th day of May 1984, certified that the name of the said Bettadapur Narayanarao Sridhar is hereby added to the said patent as a joint inventor with the said Lawrence L. Chi and Alvydas A. Kudirka.

Fred W. Sherling,
*Associate Solicitor.*